(12) United States Patent
Ogata

(10) Patent No.: US 7,083,189 B2
(45) Date of Patent: Aug. 1, 2006

(54) AIRBAG FOR HEAD PROTECTION

(75) Inventor: Tetsuya Ogata, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 250 days.

(21) Appl. No.: 10/773,441

(22) Filed: Feb. 9, 2004

(65) Prior Publication Data

US 2004/0178610 A1 Sep. 16, 2004

(30) Foreign Application Priority Data

Feb. 13, 2003 (JP) .............................. 2003-035153

(51) Int. Cl.
*B60R 21/16* (2006.01)

(52) U.S. Cl. .................................. 280/730.2

(58) Field of Classification Search ............. 280/730.2, 280/730.1, 728.1
See application file for complete search history.

(56) References Cited

U.S. PATENT DOCUMENTS 6,659,502 B1* 12/2003 Breyvogel et al. ....... 280/743.1

FOREIGN PATENT DOCUMENTS

JP B2-3110709 9/2000

* cited by examiner

*Primary Examiner*—Faye M. Fleming
(74) *Attorney, Agent, or Firm*—Posz Law Group, PLC

(57) ABSTRACT

A head-protecting airbag according to the present invention is normally folded and housed in an upper edge of windows inside a vehicle, and includes a gas admissive portion inflatable with inflation gas from inflator and a non-admissive portion admitting no inflation gas. The gas admissive portion includes a shielding portion for covering the vehicle's interior side of the windows upon deployment of the airbag. The shielding portion includes a plurality of vertical chambers each of which is located vertically upon deployment of the airbag, and at least one horizontal chamber which is located along longitudinal direction of the vehicle upon deployment of the airbag. The horizontal chamber is located between at least one neighboring pair of the vertical chambers in the vicinity of vertically middle position of the pair of the vertical chambers, thereby communicating the pair of the vertical chambers.

6 Claims, 5 Drawing Sheets

AIRBAG FOR HEAD PROTECTION

The present application claims priority from Japanese Patent Application No. 2003-035153 filed on Feb. 13, 2003, the entirety of which is hereby incorporated into the present application by this reference.

BACKGROUND OF THE INVENTION

1. Field of the Invention

The present invention relates to a head-protecting airbag which is normally folded and housed in an upper edge of windows in the interior of vehicle, and is deployable to cover the interior side of the windows upon inflow of inflation gas.

2. Description of Related Art

In the prior art, Japanese Patent No. 3110709 is illustrative of a head-protecting airbag which includes a plurality of vertical chambers in an area of a shielding portion inflatable with inflation gas.

In this conventional head-protecting airbag, each of the vertical chambers inflates by admitting inflation gas along the vertical direction upon deployment of the airbag. To paraphrase, each of the vertical chambers admits downward stream of inflation gas. With this arrangement, if an object like a vehicle occupant's head is positioned in a deployment area of one of the vertical chambers in the course of airbag deployment, especially if the object blocks an entire area of longitudinal width of the vertical chamber, the object may be subjected to considerable downward pressure along with inflow of inflation gas.

SUMMARY OF THE INVENTION

An object of the present invention is to provide a head-protecting airbag which, in the event that an object is located in the deployment area of vertical chambers, deploys while suppressing pressure put on the object.

The object of the present invention is achieved by a head-protecting airbag normally folded and housed in an upper edge of windows inside the vehicle, the airbag including a gas admissive portion inflatable with inflation gas from inflator and a non-admissive portion admitting no inflation gas, the gas admissive portion including a shielding portion for covering the vehicle's interior side of the windows upon deployment of the airbag, the shielding portion including: a plurality of vertical chambers, each of the vertical chambers being disposed vertically upon deployment of the airbag; and at least one horizontal chamber, the horizontal chamber being disposed along longitudinal direction of the vehicle upon deployment of the airbag, the horizontal chamber is located between at least one pair of the vertical chambers neighboring each other such that the horizontal chamber communicates the pair of the vertical chambers in the vicinity of vertically middle position of the vertical chambers.

In the head-protecting airbag according to the present invention, a horizontal chamber inflatable along the longitudinal direction is located between the predetermined vertical inflatable chambers. Accordingly, in the course of airbag deployment, if an object interferes with one of the vertical chambers and blocks an entire area of the longitudinal width of the vertical chamber, inflation gas having flown into the vertical chamber is able to escape into the horizontal chamber. Consequently, even if an object like an occupant's head is positioned in the area of the vertical chamber in the course of airbag deployment, downward pressure put on the object is suppressed.

Therefore, even if an object is located in deployment area of the vertical chamber, the head-protecting airbag according to the present invention is able to deploy while suppressing pressure put on the object.

Here, dispersion of inflation gas having flown into one of the vertical chambers seems to be achieved also by providing a communication port between a pair of vertical chambers neighboring each other at vertically middle position of the vertical chambers, because inflation gas having flown into one of the vertical chambers flows into the other via the communication port. However, inflation gas also flows into the other vertical chamber from upper side. Accordingly, when an object interferes with one of the vertical chambers and blocks an entire area of the longitudinal width of the vertical chamber upon deployment of the airbag, inflation gas is not able to escape into the neighboring vertical chamber, so that the inflating vertical chamber puts considerable pressure on the object.

It is also appreciated that, on condition that one of the pair of the vertical chambers deploys in an area with which an object interferes upon deployment of the airbag, the shielding portion further includes a second horizontal chamber below the first horizontal chamber, the second horizontal chamber being disposed along longitudinal direction of the vehicle, and the second horizontal chamber is closed at a side proximate to the vertical chamber in which the object is located, and is opened at the other side proximate to the other vertical chamber.

With this arrangement, the head-protecting airbag holds a wider protection area having cushioning property since the second horizontal chamber is located below the first horizontal chamber. The second horizontal chamber is closed at a side toward the vertical chamber that deploys in an area in which an object is located (as will be called the first vertical chamber), and admits inflation gas via the other vertical chamber (as will be called the second vertical chamber) upon deployment of the airbag. Accordingly, inflation gas having flown into the first vertical chamber runs through the first horizontal chamber and the second vertical chamber, and flows into the second horizontal chamber, namely, in a detouring manner. At this time, inflation gas also flows into the second vertical chamber vertically. However, since the second vertical chamber is communicated with the second horizontal chamber, and thus the second vertical chamber substantially comes to have a greater capacity, inflation gas having flown into the first horizontal chamber flows into the second vertical chamber smoothly, and then into the second horizontal chamber. In comparison with a case having no second horizontal chamber, therefore, the airbag is able to vent inflation gas to the first horizontal chamber smoothly when the object interferes with the first vertical chamber. Consequently, in the course of deployment, the airbag of the present invention is able to inflate while suppressing downward pressure on the object located in the first vertical chamber.

It is also desired that the first horizontal chamber is located at upper level than the vertically middle position of the vertical chambers that interpose the horizontal chamber.

With this arrangement, even when the object shifts upward, communication port between the first vertical chamber and the first horizontal chamber is not easily blocked in comparison with a case where the first horizontal chamber communicated with the first vertical chamber is located at lower position of the first vertical chamber. Consequently, pressure put on the object is suppressed in extended area.

DESCRIPTION OF PREFERRED EMBODIMENTS

A preferred embodiment of the present invention is described below with reference to the accompanying drawings. However, the invention is not limited to the embodiments disclosed herein. All modifications within the appended claims and equivalents relative thereto are intended to be encompassed in the scope of the claims.

Figure 1:
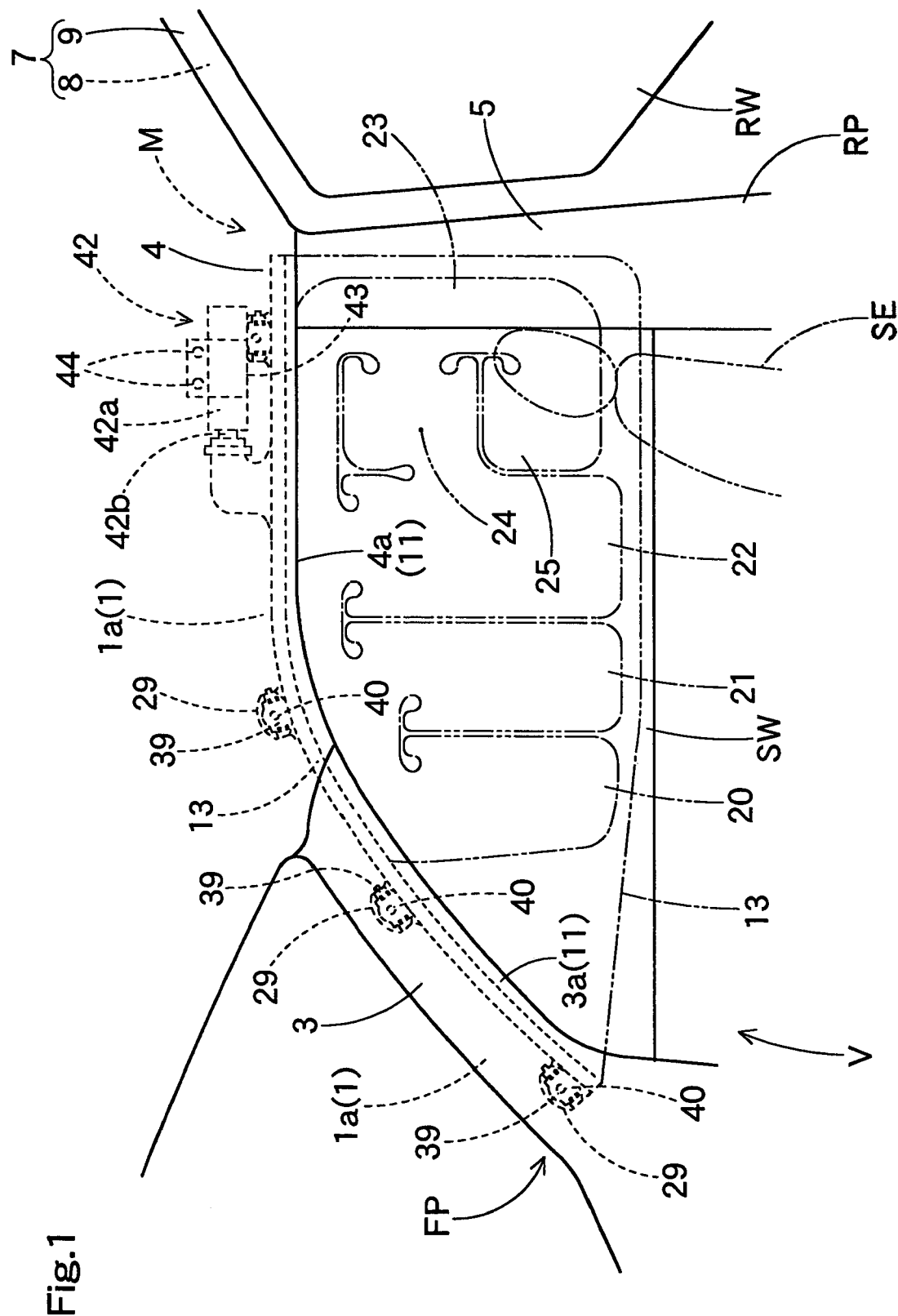
FIG. 1 is a schematic front view of a head-protecting airbag device employing an airbag according to the present invention, as viewed from the vehicle's inner side.

Referring to FIG. 1, it is seen that a head-protecting airbag 13 is employed in a head-protecting airbag device M mountable on a single-cab vehicle V. The airbag 13 is normally folded and housed in lower edges of a front pillar FP and a roof side rail RR in the upper periphery of a door and a window SW inside the vehicle.

The airbag device M includes the airbag 13, an inflator 42, and an airbag cover 11.

The single-cab vehicle V includes a side window SW located at side of a seat in which a vehicle occupant is seated and located at side of the vehicle V, and a rear wall 7 located rearward of the window SW in a manner to intersect the window SW perpendicularly. The vehicle V further includes a front pillar FP and a rear pillar RP. The front pillar FP is located forward of the window SW, and is extending obliquely downward from the roof side rail RR to locate itself substantially vertically. The rear pillar RP extends downward from the roof side rail RR between the window SW and the rear wall 7.

There are attached garnishes 3 and 5 of synthetic resin to the pillars FP and RP, respectively, for covering an inner panel 1a of sheet metal as a member of a vehicle body 1. There is also attached a roof head lining 4 of synthetic resin to the roof side rail RR, for covering the inner panel 1a inside the vehicle.

Referring to FIG. 1, the rear wall 7 includes a rear panel 8 as a member of the vehicle body 1, which is made of sheet metal, and a rear trim 9 made of synthetic resin for covering vehicle's interior surface of the rear panel 8. The rear wall 7 includes a rear window RW in its upper side. The upper end side of the rear wall 7 is covered with the roof head lining 4 extended from ceiling.

The airbag cover 11 is constituted by lower edge 3a of the front pillar garnish 3 and lower edge 4a of the roof head lining 4. The airbag cover 11 is located to cover the vehicle's interior side of the folded and housed airbag 13, and is prearranged to open when pushed by the inflating airbag 13 for allowing the airbag 13 to protrude inward of the vehicle.

Figure 3:
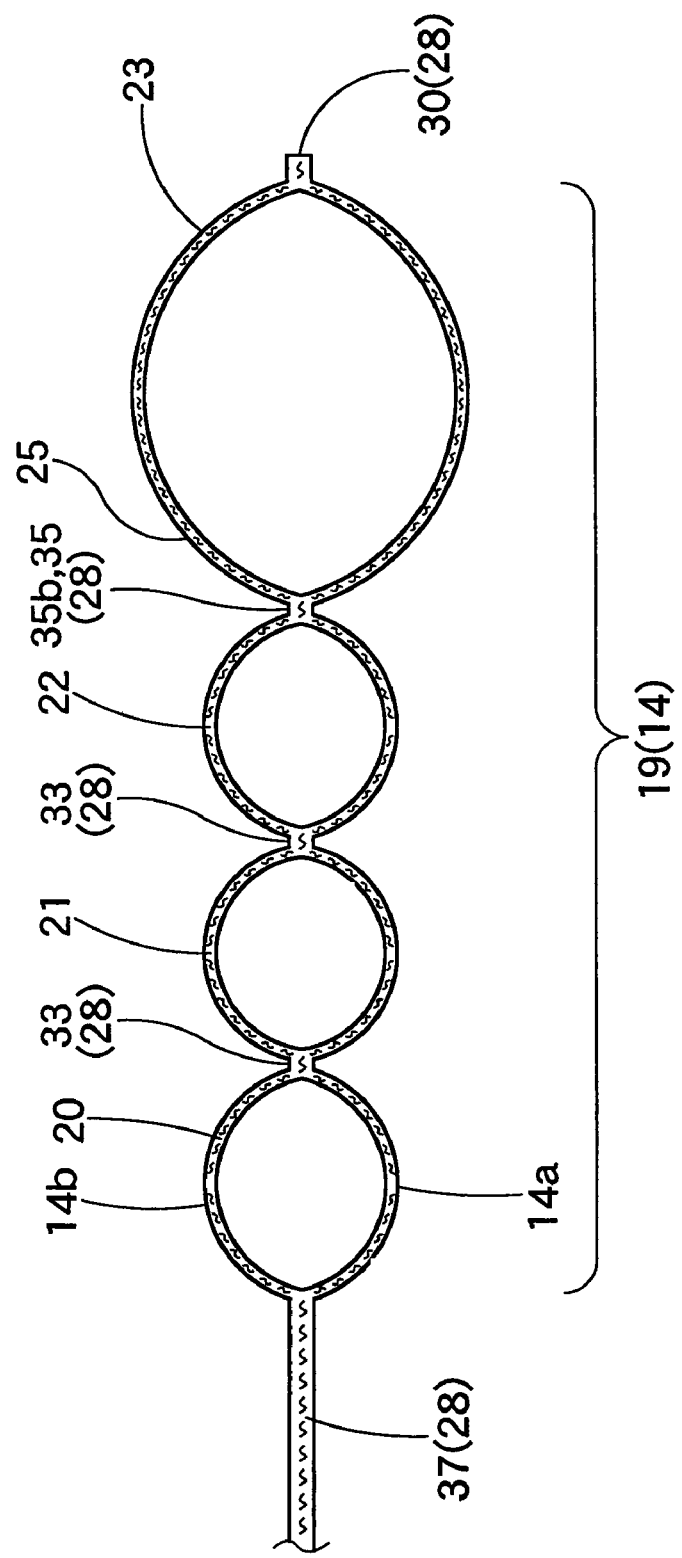
FIG. 3 is an enlarged section taken along line III—III of FIG. 2.
Figure 4:
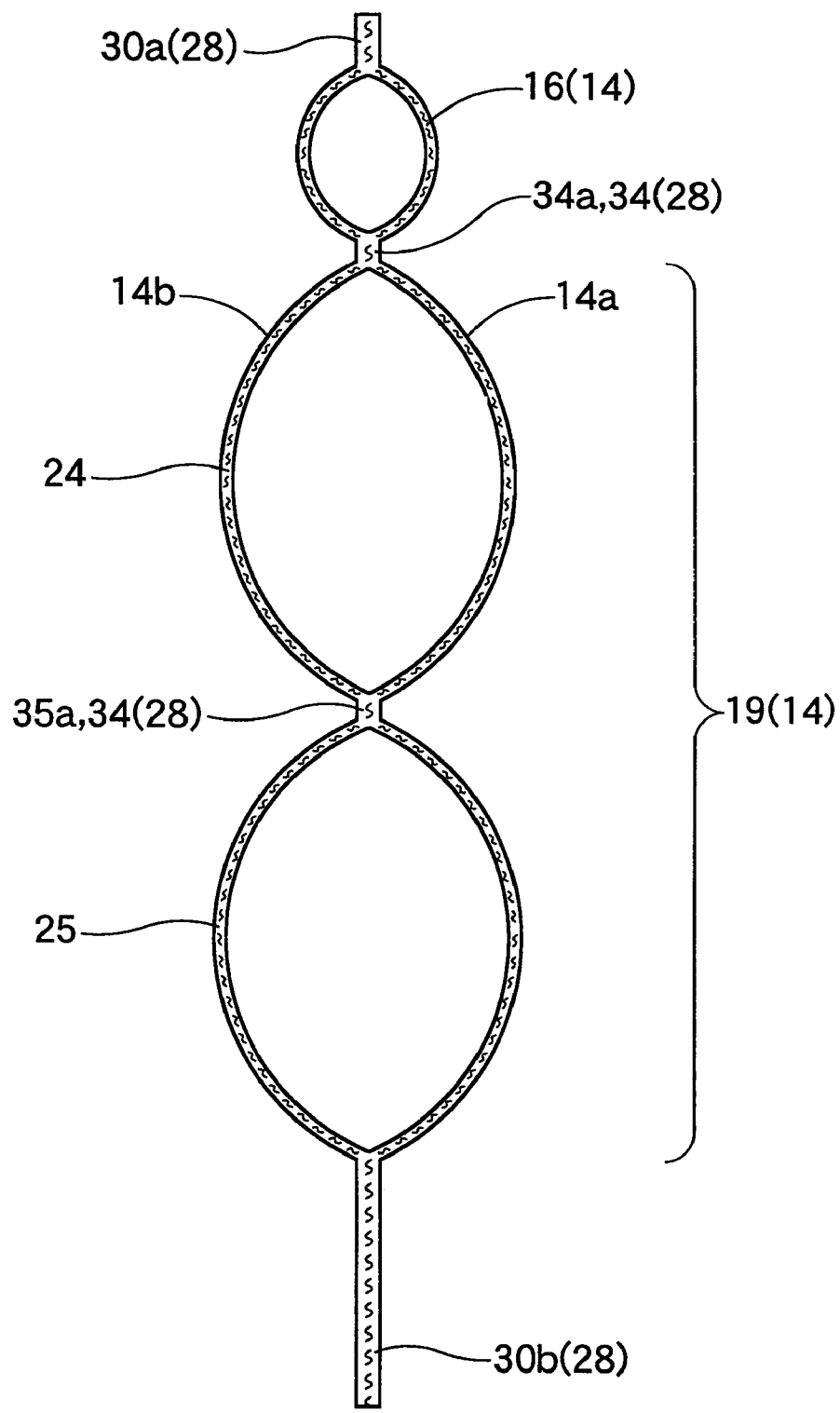
FIG. 4 is an enlarged section taken along line IV—IV of FIG. 2.

The airbag 13 is made of polyamide yarn by hollow-weaving method. As referred to FIGS. 2 to 4, the airbag 13 is expanded from folded state upon inflow of inflation gas G from the inflator 42, and covers the window SW and the rear pillar RP inside the vehicle. The airbag 13 includes a gas admissive portion 14 which admits inflation gas G inside and separates its vehicle's inner wall 14a and vehicle's outer wall 14b, and a non-admissive portion 28 which admits no inflation gas G.

In the foregoing embodiment, the gas admissive portion 14 includes a gas feed passage 16, a gas inlet port 17, and a shielding portion 19.

Figure 2:
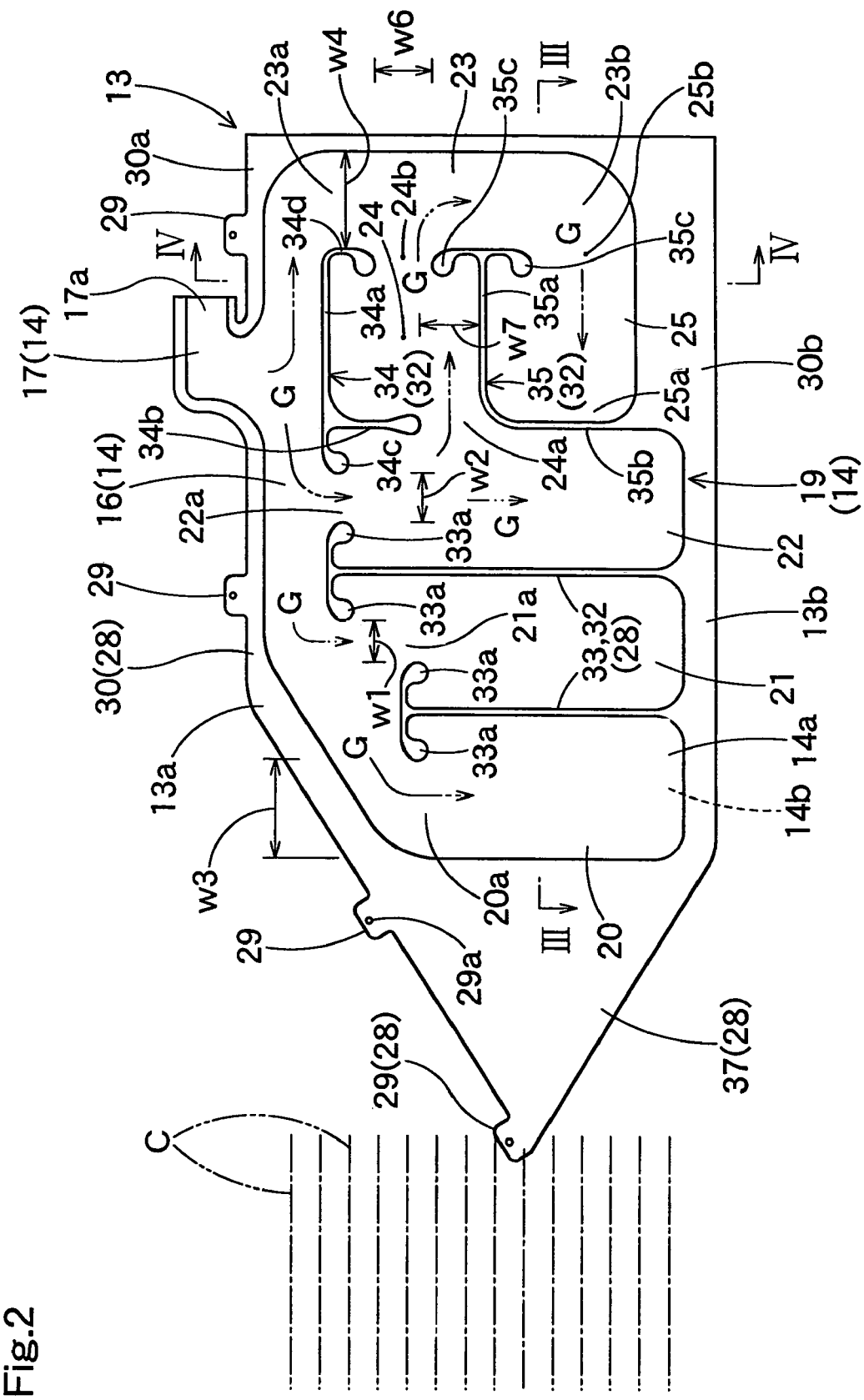
FIG. 2 is a front view of the airbag of FIG. 1 as flatly expanded.

As best shown in FIG. 2, the gas feed passage 16 is disposed along the upper edge 13a of the airbag 13 in the longitudinal direction of the vehicle V, over substantially entire length of the airbag 13. The gas feed passage 16 is adapted to guide inflation gas G discharged from the inflator 42 to the shielding portion 19 located below the gas feed passage 16. The gas inlet port 17 is projected upward from the airbag 13 at a longitudinal middle of the gas feed passage 16 (above a later-described horizontal chamber 24, in the foregoing embodiment). The gas inlet port 17 is connected to the inflator 42, while being communicated with the gas feed passage 16. In the foregoing embodiment, the gas inlet port 17 is opened at its rear end 17a side.

The shielding portion 19 is adapted to cover the vehicle's interior side of the window SW upon deployment of the airbag 13, and includes four vertical chambers 20, 21, 22 and 23, which are disposed vertically, and two horizontal chambers 24 and 25, which are disposed in the longitudinal direction. The vertical chambers 20, 21, and 22 are juxtaposed along the longitudinal direction of the vehicle V in the front side of the airbag 13. The vertical chamber 23 neighbors the vertical chamber 22 while interposing the horizontal chambers 24 and 25. In the foregoing embodiment, the vertical chamber 23 is located at the rear end side of the airbag 13. The horizontal chambers 24 and 25 are juxtaposed along the vertical direction.

Each of the vertical chambers 20, 21 and 22 is communicated with the gas feed passage 16 at each of the upper ends 20a, 21a and 22a, and is closed at the lower end. The vertical chamber 23 is communicated with the gas feed passage 16 at its upper end 23a, and communicated with the horizontal chamber 25 near its lower end 23b.

With respect to the vertical chambers 21 and 22 located in the middle of the longitudinal direction, their openings at the upper ends 21a and 22a have smaller widths w1 and w2 than widths w3 and w4 of openings at upper ends 20a and 23a of the vertical chambers 20 and 23 located at front and rear end sides. This is because the vertical chambers 21 and 22 are located upstream of inflation gas G or in the vicinity of the gas inlet port 17. That is, in the foregoing embodiment, the opening widths w1 and w2 at the upper ends 21a and 22a of the vertical chambers 21 and 22 are preset smaller than the opening widths w3 and w4 at upper ends 20a and 23a of the vertical chambers 20 and 23 such that inflation gas G is refrained from flowing into the vertical chambers 21 and 22 but instead flows widely along the longitudinal direction in the initial stage of inflation of the airbag 13. The vertical chambers 22 and 23 are communicated with each other by way of the horizontal chamber 24, at a little upper position from the vertically middle position. As shown in FIG. 1, the vertical chamber 22 is adapted to be located at the side of and forward of the seat SE upon deployment of the airbag 13. That is, the vertical chamber 22 takes a side position of an occupant's head upon deployment of the airbag 13.

The horizontal chamber 24 is open at its front and rear ends 24a and 24b, and thus is communicated with the vertical chambers 22 and 23 located at its front and rearward. The horizontal chamber 24 is located below the gas feed passage 16, and at a little upper position from the middle of the vertical direction of the vertical chamber 22. The horizontal chamber 25 is located below the horizontal chamber 24 to neighbor the horizontal chamber 24. The horizontal chamber 25 is open at its rear end 25b to communicate with the vertical chamber 23, while being closed at its front end 25a toward the vertical chamber 22.

Figure 5:
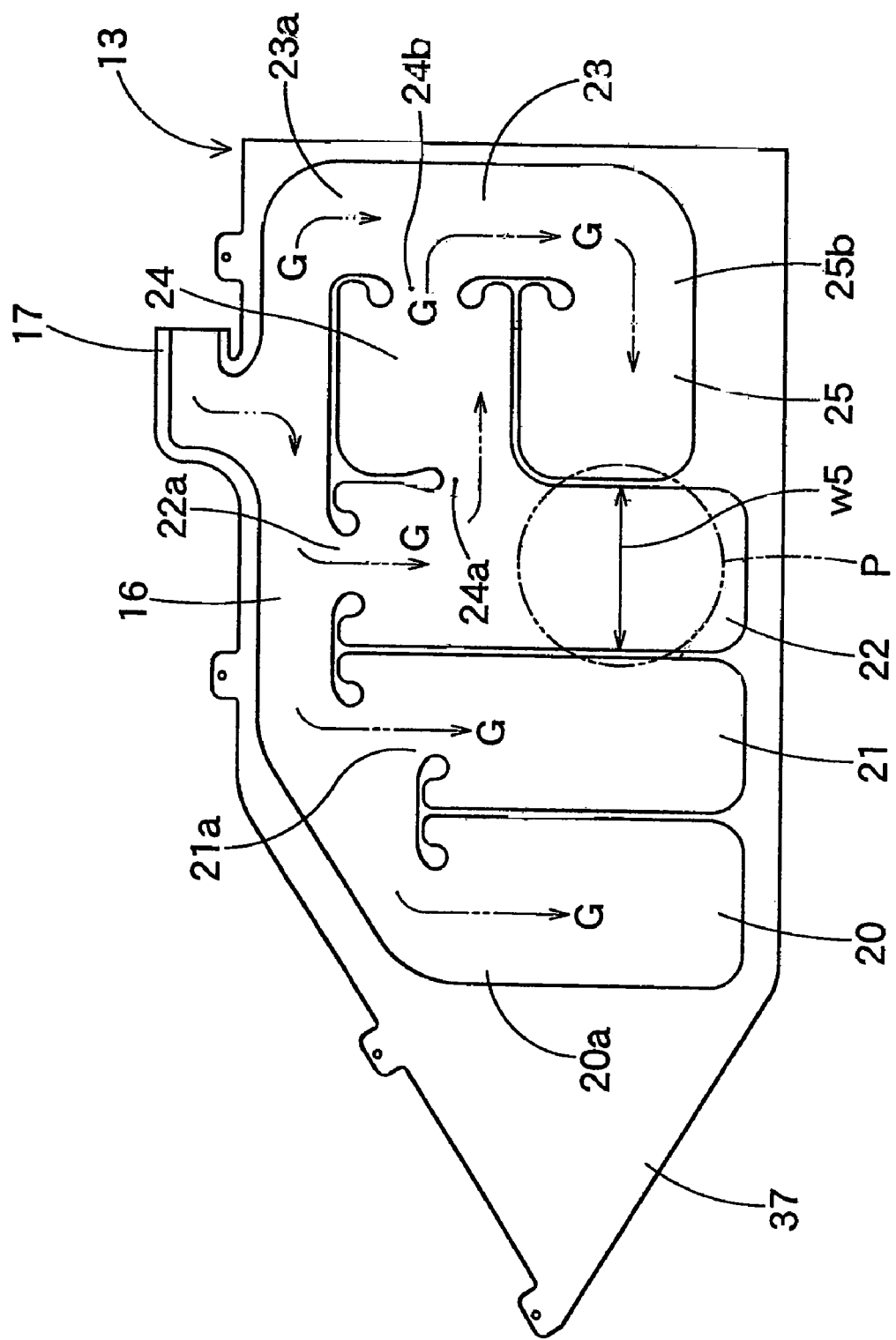
FIG. 5 schematically illustrates the stream of inflation gas in the airbag of FIG. 1 as an object interferes with the airbag.

In the airbag 13, if an object P interferes with the vertical chamber 22 and obstructs an entire area of the longitudinal width w5 of the vertical chamber 22, as indicated by double-dotted lines in FIG. 5, inflation gas G having flown into the vertical chamber 22 vertically from the open upper end 22a flows into the horizontal chamber 24 horizontally through an opening at the front end 24a. Subsequently, inflation gas G, running through the other opening at the rear end 24b, flows downward within the vertical chamber 23, and flows into the horizontal chamber 25 through its rear end 25b communicated with the lower end portion 23b of the vertical chamber 23. In other words, inflation gas G having flown into the vertical chamber 22 flows into the horizontal chamber 25 via the horizontal chamber 24 and the vertical chamber 23, in a detouring manner. At this time, the vertical chamber 23 also admits vertical stream of inflation gas G from the open upper end 23a. Since the vertical chamber 23 communicates with the horizontal chamber 25, the vertical chamber 23 substantially has a greater capacity. Accordingly, inflation gas G having flown into the horizontal chamber 24 flows into the horizontal chamber 25 smoothly via the vertical chamber 23.

As best shown in FIG. 2, the non-admissive portion 28 is formed by joining the vehicle's inner side wall 14a and the vehicle's outer side wall 14b, and includes a plurality of mounting portions 29, a peripheral portion 30, a partitioning portion 32 and a panel portion 37.

The peripheral portion 30 is located around and neighbors the gas admissive portion 14, and is densely formed so as not to cause gas leakage.

The mounting portions 29 are projected upward, in the foregoing embodiment, at four positions in the upper edge 30a of the peripheral portion 30 and in the upper edge of the panel portion 37 in the upper edge 13a of the airbag 13. Each of the mounting portions 29 is provided with a hole 29a for inserting amounting bolt 40 thereinto, and a bracket 39 is attached thereto for attachment of the airbag 13 to the inner panel 1a. Each of the mounting portions 29 is secured to the inner panel 1a of sheet metal together with the bracket 39 by means of the mounting bolt 40.

The panel portion 37 is formed into a substantially triangular shape and is projected forward from front edge of the peripheral portion 30. The panel portion 37 is provided with mounting portions 29 at its front end and in the vicinity of the rear end which is close to the front edge of the shielding portion 19, as shown in FIG. 2.

The partitioning portion 32 is located in the area of the shielding portion 19, and includes vertical partitions 33 and horizontal partitions 34 and 35. The vertical partitions 33 are juxtaposed along the longitudinal direction in the vehicle's front side area of the shielding portion 19 to partition the individual vertical chambers 20, 21 and 22. In the foregoing embodiment, two vertical partitions 33 are provided, and each of the vertical partitions 33 takes a linear shape arranged vertically. Each of the vertical partitions 33 is provided at the upper end with extended portions 33a extended forward and rearward, and has a substantially T-shape. That is, as referred to FIG. 2, the vertical chamber 21 is predetermined to have a small opening width w1 since the extended portions 33a and 33a are extended from the front and rear vertical partitions 33 at the vicinity of the upper end 21a. Each of the vertical partitions 33 are joined with a lower edge portion 30b of the peripheral portion 30 at the lower end.

The horizontal partitions 34 and 35 are juxtaposed in the vertical direction in the vehicle's rear side area of the shielding portion 19 to partition the horizontal chambers 24, 25 and the vertical chambers 22 and 23. Each of the horizontal partitions 34 and 35 has a linear shape arranged along the longitudinal direction, and has a substantially inverted L shape.

The horizontal partition 34 located in upper side includes a horizontal portion 34a that constitutes lower edge of the gas feed passage 16, and a vertical portion 34b partitioning an upper end part of the horizontal chamber 24 and the vertical chamber 22. The horizontal partition 34 further includes an extended portion 34c extending forward from the front end of the horizontal portion 34a, and an extended portion 34d extending downward from the rear end of the horizontal portion 34a. That is, as referred to FIG. 2, the vertical chamber 22 is predetermined to have a small opening width w2 because of the extended portion 33a extended from the vertical partition 33 in the front side and the extended portion 34c extended from the horizontal partition 34 in the rear side, both of which are located in the vicinity of the upper end 22a.

The horizontal partition 35 located in lower side includes a horizontal portion 35a and a vertical portion 35b. The horizontal portion 35a partitions the horizontal chambers 24 and 25. The vertical portion 35b is extended downward from the front end of the horizontal portion 35a in a bended manner, and is joined with the lower edge portion 30b of the peripheral portion 30. Thus, the horizontal chamber 25 is closed at the side of the vertical chamber 22 by the vertical portion 35b. The horizontal partition 35 further includes extended portions 35c extended upward and downward from the rear end of the horizontal portion 35a. That is, as referred to FIG. 2, the horizontal chamber 24 is predetermined to have a small opening width w6 because of the extended portion 34d extended from the horizontal portion 34a and the extended portion 35c extended from the horizontal portion 35a both of which are located in the vicinity of the rear end 24b. This helps restrain inflation gas G having flown into the vertical chamber 23 in the initial stage of inflation of the airbag 13 from flowing into the horizonal chamber 24, and expand the vertical chamber 23 downward swiftly. Of course, however, even if an object interferes with the vertical chamber 23 in the initial stage of inflation of the airbag 13, inflation gas G having flown into the vertical chamber 23 is able to flow into the horizontal chamber 24 smoothly from the opening at the rear end 24b side, so that pressure on the object is reduced. Here, in the horizontal chamber 24 of the foregoing embodiment, the opening width w6 at the rear end 24b side is made smaller than an opening width w7 at the front end 24a side.

Referring back to FIG. 1, the inflator 42 includes a substantially cylindrical main body 42a, and a feed pipe 42b for guiding inflation gas from the main body 42a into the airbag 13. The inflator 42 is connected to the airbag 13 with a cramp (reference numeral omitted) by having the inlet port 17 of the airbag 13 mounted around a leading end of the feed pipe 42b. The inflator 42 is secured to the inner panel 1a in the roof side rail RR over the rear pillar RP by means of a bracket 43 and bolts 44, while being covered at the vehicle's interior side by the lower edge 4a of the roof head lining 4.

Mounting of the airbag 13 on the vehicle V is now described. Firstly, the airbag 13 is folded up. More specifically, the airbag 13 is folded up from flat expanded state, in a bellows fashion on crest and valley folds C, as indicated by single-dotted lines in FIG. 2, so that the lower edge 13$b$ of the airbag 13 is brought close to the upper edge 13$a$.

Then the folded airbag 13 is wrapped up at predetermined positions by a not-shown wrapping member for keeping the folded-up configuration. In the meantime, the mounting brackets 39 are attached to the individual mounting portions 29. The aforementioned cramp is employed to join the inflator 42 to the gas inlet port 17, and then the mounting bracket 43 is mounted there around. Thus the inflator 42 is assembled with the airbag 13 to form an airbag module.

Thereafter, the individual mounting brackets 39 and 43 are secured to predetermined positions of the inner panel 1$a$ by the bolts 40 and 44, so that the airbag module is mounted on the vehicle body 1. Subsequently, a not-shown lead wire leading from a predetermined control device for actuating the inflator is connected to the inflator 42. If the front pillar garnish 3, the roof head lining 4, and further the rear pillar garnish 5 are attached to the vehicle body 1, the airbag 13 is mounted on the vehicle V together with the airbag device M.

When the inflator 42 is actuated after the airbag device M is mounted on the vehicle V, inflation gas G from the inflator 42 flows through the gas feed passage 16 from the gas inlet port 17, as indicated by double-dotted lines in FIG. 2. The inflation gas G subsequently flows into the shielding portion 19 from the gas feed passage 16, then the shielding portion 19 starts to inflate while being unfolded. The airbag 13 then breaks the wrapping member, pushes and opens the airbag cover 11 constituted by the lower edges 3$a$ and 4$a$ of the front pillar garnish 3 and the roof head lining 4, and protrudes downward therefrom to cover the vehicle's interior side of the window SW and the rear pillar RP as indicated by double-dotted lines in FIG. 1, while expanding and inflating.

In the head-protecting airbag 13 according to the present invention, there is located between the vertical chambers 22 and 23 the horizontal chamber 24 which admits inflation gas G along the longitudinal direction. Accordingly, in the course of deployment of the airbag 13, when an object P interferes with the vertical chamber 22 and obstructs an entire area of the longitudinal width w5 of the vertical chamber 22, as indicated by double-dotted lines in FIG. 5, inflation gas G having flown into the vertical chamber 22 is able to escape into the horizontal chamber 24 via the opening at the front end 24$a$ side. Consequently, even if the object P is positioned in the area of the vertical chamber 22 in the course of inflation of the airbag 13, downward pressure put on the object P is reduced.

Therefore, even if the object P is located in deployment area of the vertical chamber 22, the head-protecting airbag 13 according to the present invention is able to deploy while reducing pressure on the object P.

Moreover, in the airbag 13, the horizontal chamber 25 is located below the horizontal chamber 24. The horizontal chamber 25 is communicated with the horizontal chamber 24 by having its side toward the vertical chamber 23 opened, and is closed at the side toward the vertical chamber 22. That is, the airbag 13 holds a wider protection area having cushioning property since the horizontal chamber 25 is located below the horizontal chamber 24. As referred to FIG. 5, moreover, inflation gas G flows out of the opening at the rear end 24$b$ of the horizontal chamber 24, runs through the vertical chamber 23, and flows into this horizontal chamber 25 via the opening at the rear end 25$b$. In other words, inflation gas G having flown into the vertical chamber 22 interfering with the object P makes a detour via the horizontal chamber 24 and the vertical chamber 23, and then flows into the horizontal chamber 25. At this time, inflation gas G also flows into the vertical chamber 23 vertically. Since this vertical chamber 23 is communicated with the horizontal chamber 25, the vertical chamber 23 substantially has a greater capacity. Accordingly, inflation gas G having flown into the horizontal chamber 24 flows into the vertical chamber 23 smoothly, and then into the horizontal chamber 25. In comparison with a case having no horizontal chamber 25, therefore, the airbag 13 is able to vent inflation gas G to the horizontal chamber 24 smoothly when the object P interferes with the vertical chamber 22. Consequently, in the course of deployment, the airbag 13 is able to inflate while suppressing downward pressure on the object P in the vertical chamber 22.

Of course, without considering this point, the horizontal chamber 25 does not have to be located below the horizontal chamber 24. Alternatively, when the horizontal chamber 25 is located, the horizontal chamber 25 may be communicated with the vertical chamber 22 at the front end 25$a$ side.

Furthermore, in the airbag 13, the horizontal chamber 24 is located above a vertically middle position of the vertical chambers 22 and 23. With this arrangement, even when the object P shifts upward, the opening of the horizontal chamber 24 at the front end 24$a$, through which the vertical chamber 22 and the horizontal chamber 24 are communicated with each other, is not easily blocked in comparison with a case where the horizontal chamber 24 communicated with the vertical chamber 22 is located at lower position of the vertical chamber 22. Consequently, pressure put on the object P is suppressed in extended area.

Without considering this point, the horizontal chamber 24 may be located in a lower position than the vertically middle position of the vertical chambers 22 and 23.

Although the preferred embodiment shows the airbag 13 having the horizontal chamber 24 between a pair of the vertical chamber 22 and 23, arrangements of the airbag to which the present invention is applicable is not intended to be limited thereby. For example, the airbag may include a plurality of pairs of vertical chambers each of which interposes a horizontal chamber therebetween. On the other hand, although the preferred embodiment shows a set of the vertical chambers 22 and 23 and the horizontal chamber 24 located in the rear side of the airbag 13, the set of the vertical chambers and a horizontal chamber may be located in the front side of the airbag. Moreover, the set of the vertical chambers and a horizontal chamber may be located in a longitudinal middle position of the airbag.

Although the airbag device M employing the airbag 13 is described as mounted on a single-cab vehicle in the preferred embodiment, vehicle type on which the airbag of the present invention is mountable is not intended to be limited thereby. For example, an airbag device employing the airbag of the present invention may be mounted on a double-cab vehicle or a sedan-type vehicle.

What is claimed is:

1. A head-protecting airbag mountable on a vehicle normally folded and housed in an upper edge of windows inside the vehicle, the airbag comprising a gas admissive portion inflatable with inflation gas from inflator, a non-admissive portion admitting no inflation gas, and a gas feed passage disposed along an upper edge of the airbag, the gas admissive portion comprising a shielding portion, located below the gas feed passage, for covering the vehicle's interior side of the windows upon deployment of the airbag, the gas feed passage being adapted to guide inflation gas discharged from the inflator to the shielding portion, the shielding portion comprising: a plurality of vertical chambers, each of the vertical chambers being disposed vertically upon deployment of the airbag and being communicated with the gas feed passage; and at least one horizontal chamber, the horizontal chamber being disposed along longitudinal direction of the vehicle upon deployment of the airbag, the horizontal chamber is located between at least one pair of the vertical chambers neighboring each other such that the horizontal chamber communicates the pair of the vertical chambers in the vicinity of vertically middle position of the vertical chambers.

2. The head-protecting airbag according to claim 1, wherein:

one of the pair of the vertical chambers deploys in an area with which an object interferes upon deployment of the airbag, the shielding portion further comprises a second horizontal chamber located below the horizontal chamber as set forth in claim 1, the second horizontal chamber being disposed along longitudinal direction of the vehicle, and the second horizontal chamber is closed at a side proximate to the vertical chamber in which the object is located, and is opened at the other side proximate to the other vertical chamber.

3. The head-protecting airbag according to claim 1, wherein the horizontal chamber is located at upper level than the vertically middle position of the vertical chambers that interpose the horizontal chamber.

4. The head protecting airbag according to claim 1, wherein the gas feed passage is disposed over substantially the entire length of the airbag.

5. The head protecting airbag according to claim 1, wherein the gas admissive portion further comprises a gas inlet port projected upward at a longitudinal middle of the gas feed passage.

6. The head protecting airbag according to claim 1, wherein the plurality of vertical chambers includes a first vertical chamber and a second vertical chanter located upstream of the first vertical chamber, wherein an opening width of an upper end of the second vertical chamber is smaller than an opening width of an upper end of the first vertical chamber.

* * * * *